(12) United States Patent
Kummeter et al.

(10) Patent No.: US 6,550,396 B2
(45) Date of Patent: *Apr. 22, 2003

(54) GUIDE WHEEL ASSEMBLY

(75) Inventors: Stefan Kummeter, Böblingen (DE); William K. Cooper, Monroeville, PA (US); Holger Strubelt, Jefferson Hills, PA (US); Ralf Krause, Hanau (DE); Jeffrey J. Schwalm, Holbrock, PA (US)

(73) Assignee: DaimlerChrysler AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/046,353

(22) Filed: Oct. 29, 2001

(65) Prior Publication Data

US 2002/0073881 A1 Jun. 20, 2002

Related U.S. Application Data

(63) Continuation of application No. 09/462,375, filed as application No. PCT/US99/22795 on Oct. 1, 1999.
(60) Provisional application No. 60/102,799, filed on Oct. 2, 1998.

(51) Int. Cl.[7] ................................................. B61F 1/00
(52) U.S. Cl. ................................................. 105/215.1
(58) Field of Search .................... 105/215.1, 215.2, 105/72.2; 74/527; 104/242, 243, 245, 247, 130.09, 130.01, 137, 139, 140, 295; 301/36.3, 13.2, 64.4, 111, 112

(56) References Cited

U.S. PATENT DOCUMENTS

| 991,218 A | 5/1911 | Lockwood |
| 1,355,575 A | * 10/1920 | Sederholm ................ 191/45 R |
| 1,374,987 A | 4/1921 | Christopherson |
| 1,386,164 A | * 8/1921 | Dade .................... 301/64.303 |
| 1,722,493 A | 7/1929 | Brunner |
| 1,761,490 A | 6/1930 | Penner |
| 1,795,992 A | 3/1931 | Blume |
| 3,099,491 A | * 7/1963 | Peras .......................... 301/126 |
| 3,404,746 A | 10/1968 | Slay |
| 3,540,380 A | 11/1970 | Turnpak et al. |
| 3,902,431 A | 9/1975 | McCain |
| 4,090,452 A | 5/1978 | Segar |
| 4,248,157 A | 2/1981 | Evans |
| 4,304,446 A | * 12/1981 | Goodine .................... 384/477 |
| 4,389,945 A | 6/1983 | Bahrle et al. .............. 104/247 |
| 4,566,391 A | 1/1986 | Haberl et al. |
| 4,682,547 A | 7/1987 | Schwarzkopf |
| 4,787,679 A | 11/1988 | Arnold |
| 4,831,937 A | 5/1989 | Yamada |
| 5,033,589 A | 7/1991 | Rhodes |
| 5,115,746 A | 5/1992 | Scarpatetti .................. 104/245 |
| 5,119,734 A | 6/1992 | Schwarzkopf |
| 5,588,752 A | 12/1996 | Fetty |
| 5,704,295 A | * 1/1998 | Lohr .......................... 105/72.2 |
| 5,788,335 A | * 8/1998 | O'Brien .................... 301/40.6 |
| 6,012,396 A | 1/2000 | Schulz |

FOREIGN PATENT DOCUMENTS

DE 2935386 3/1981

* cited by examiner

Primary Examiner—S. Joseph Morano
Assistant Examiner—Frantz F. Jules
(74) Attorney, Agent, or Firm—Webb Ziesenhiem Logsdon Orkin & Hanson, P.C.

(57) ABSTRACT

A guide wheel assembly, which can be pre-assembled as a single unit, is configured to be connectable to a guide frame of a rail guided vehicle. The guide wheel assembly generally includes a fixed component connectable to the guide frame and a rotating component rotatably supported on the fixed component by a bearing assembly. The elements of the fixed component, the rotating component and the bearing assembly are assembled on a shaft of the fixed component from a top or first end of the shaft. The shaft includes a support member secured at a second end of the shaft and configured to prevent the rotating component from detaching from the fixed component in the event of bearing failure.

12 Claims, 4 Drawing Sheets

GUIDE WHEEL ASSEMBLY

CROSS-REFERENCE TO RELATED APPLICATION

This application is a continuation of U.S. patent application Ser. No. 09/462,375, filed Jan. 7, 2000, which is a United States National Phase of PCT/US99/22795, filed Oct. 1, 1999, which claims priority to U.S. Provisional Patent Application Ser. No. 60/102,799, filed Oct. 2, 1998.

BACKGROUND OF THE INVENTION

1. Field of the Invention

The present invention relates to rail guided vehicles and, more particularly, to guide wheels for guide frames of rail guided vehicles.

2. Description of the Prior Art

Rail guided vehicles typically include one or more guide frames that cooperate with, or "follow", a guide rail to steer the vehicle. Typical prior art rail guided vehicles include people movers, light rail vehicles and land vehicles such as buses. Multiple guide wheels attached to the guide frame of the vehicle provide the physical interface between the vehicle and the guide rail.

In general, prior art guide wheels include a fixed portion connected to a rotating portion by a bearing. The fixed portion is generally attached to the guide frame of the vehicle. The bearing generally serves to secure the rotating portion to the fixed portion and support the rotating portion in the vertical direction. Prior art guide wheels suffer from the disadvantage that in the event of failure of the bearing, the rotating portion may separate from the fixed portion and fall onto the roadway or the rail bed along which the vehicle travels. This debris is a hazard to following vehicles and, in particular, could potentially cause a derailment of following railway vehicles. Furthermore, the loss of one or more guide wheels in this manner also means loss of guidance for the vehicle, which could result in a derailment of the vehicle and injury to the occupants of the vehicle.

In addition, prior art guide wheels typically cannot be easily pre-assembled and attached to the guide frame of the vehicle. The fixed portion of the guide wheel must first be attached to the guide frame of the vehicle. Next, the rotating portion must be mounted to the fixed portion by the bearing.

Consequently, a need exists for a safer alternative to the guide wheels currently used in the art. In addition, a need exists for guide wheels that are simpler to install and maintain than the guide wheels currently known in the art.

Therefore, it is an object of the present invention to provide a guide wheel assembly having improved safety characteristics. In addition, it is an object of the present invention to provide a guide wheel assembly that can be easily pre-assembled and attached to a guide frame of a rail guided vehicle. Furthermore, it is an object of the present invention to provide a guide wheel assembly having improved installation and maintenance characteristics.

SUMMARY OF THE INVENTION

The above objects are accomplished with a guide wheel assembly made in accordance with the present invention. The guide wheel assembly is generally attached to a guide frame of a rail guided vehicle. The guide wheel assembly includes a shaft having a first end and a second end. The shaft has an integrally formed flange located adjacent the second end of the shaft. A sleeve is positioned about the shaft. The sleeve has a first end face and a second end face. The first end face is configured for attachment to the guide frame of the rail guided vehicle. A bearing is positioned rotatably about the shaft and located axially between the flange and the second face of the sleeve. A rotating assembly is positioned about the bearing and coupled to the shaft by the bearing. The rotating assembly is configured to cooperate with a vertical guide rail configured to guide the rail guided vehicle laterally. The rotating assembly further includes a hub having an integrally formed and radially extending safety disc with two faces and a pair of rims each having a guide tire connected thereto. The rims are connected respectively to the two faces of the safety disc. The guide tires are configured to engage the vertical guide rail. The safety disc at least partially extends between the guide tires such that in an event of failure of the guide tires the safety disc limits lateral movement of the guide tires with respect to the guide rail. Furthermore, a support member, such as a washer, is preferably welded to the second end of the shaft for supporting the bearing and the rotating component in a vertical direction in the event of failure of the bearing.

The guide wheel assembly may include a dust cover positioned about the sleeve and extending between the sleeve and the hub for preventing dirt from entering the bearing. The guide wheel assembly may further include a snap ring positioned about the flange and configured to secure the bearing to the hub. The first end face of the sleeve may be formed as a connecting flange defining a bolt circle such that the guide wheel assembly is connectable to the guide frame of the rail guided vehicle with a plurality of bolts cooperating with the bolt circle. The bolt circle may have a centerline coextensive with a central axis of the shaft. Alternatively, the centerline of the bolt circle may be offset radially from the central axis of the shaft. The bearing is preferably a UNIPAC® sealed and greased double row tapered roller bearing.

A method of assembling a guide wheel assembly configured for attachment to the guide frame of the rail guided vehicle is also part of the present invention. Further details and advantages of the present invention will become apparent from the following detailed description, in conjunction with the drawings.

DETAILED DESCRIPTION OF THE PREFERRED EMBODIMENT

Figure 1:
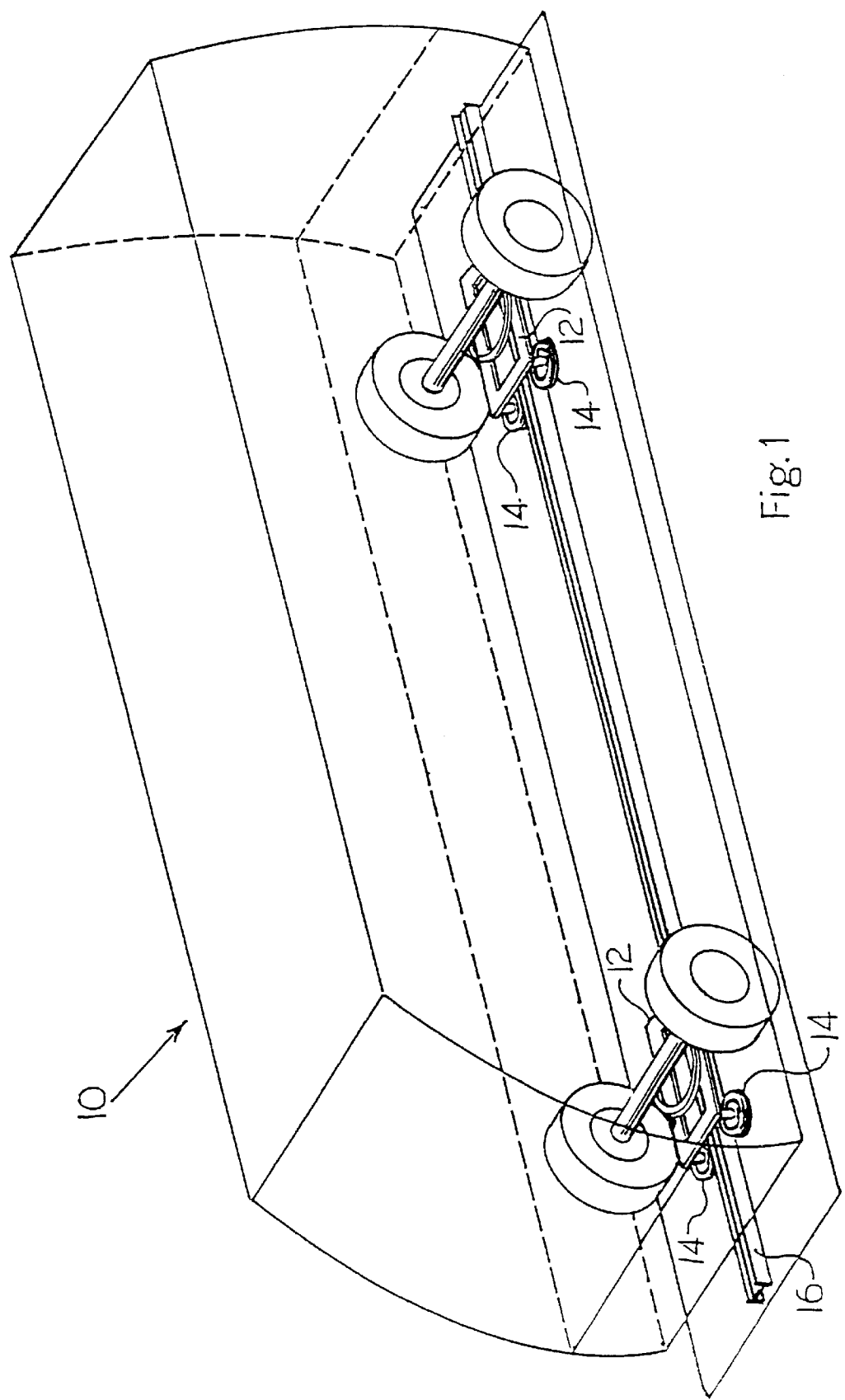
FIG. 1 is a perspective view of a rail guided vehicle having a guide frame and showing the rail guided vehicle cooperating with a guide rail.

FIG. 1 shows a rail guided vehicle 10 having a guide frame 12 with a plurality of guide wheel assemblies 14 attached thereto and made in accordance with the present invention. The rail guided vehicle 10 is shown as a people mover in FIG. 1, but may be any type of rail guided vehicle such as a land vehicle or a light rail vehicle. The guide frame 12 connected to the vehicle 10 "follows" or cooperates with a guide rail 16 through the interaction between the guide wheel assemblies 14 and the guide rail 16. The guide rail 16 is vertically oriented and guides the vehicle 10 in a known fashion. The vehicle 10 generally includes two guide frames 12 which are located substantially at opposed ends of the vehicle 10. As shown in FIG. 1, each of the guide frames 12 will generally include four downward depending guide wheel assemblies 14, two on each side of the guide rail 16. The guide wheel assemblies 14 provide the physical link between the vehicle 10 and the guide rail 16. The guide frames 12 through the interaction between the guide wheel assemblies 14 and the guide rail 16 steer the vehicle 10.

Figure 2:
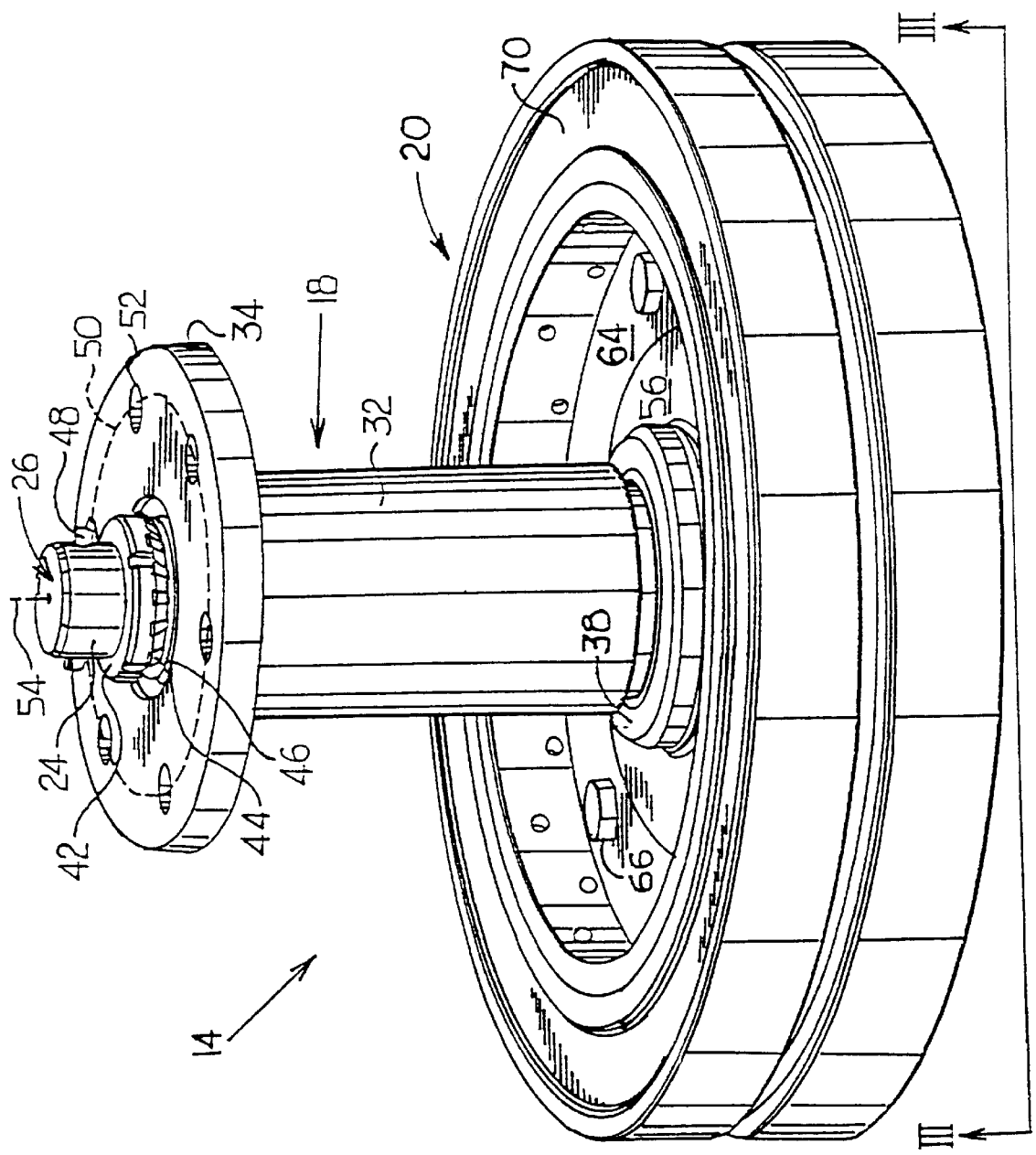
FIG. 2 is a perspective view of a guide wheel assembly made in accordance with the present invention.
Figure 3:
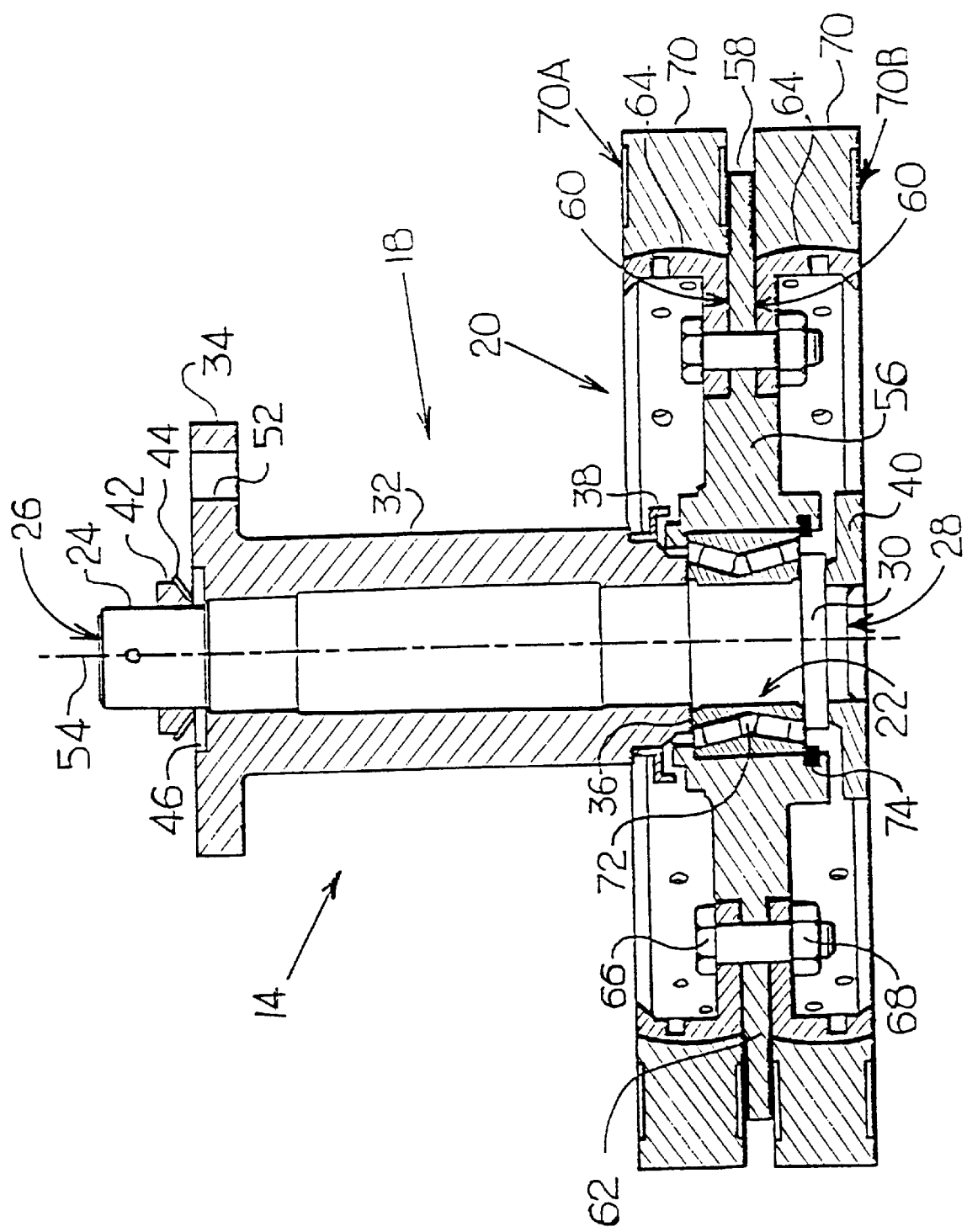
FIG. 3 is a sectional view of the guide wheel assembly of FIG. 1 along section line III—III in FIG. 1.
Figure 4:
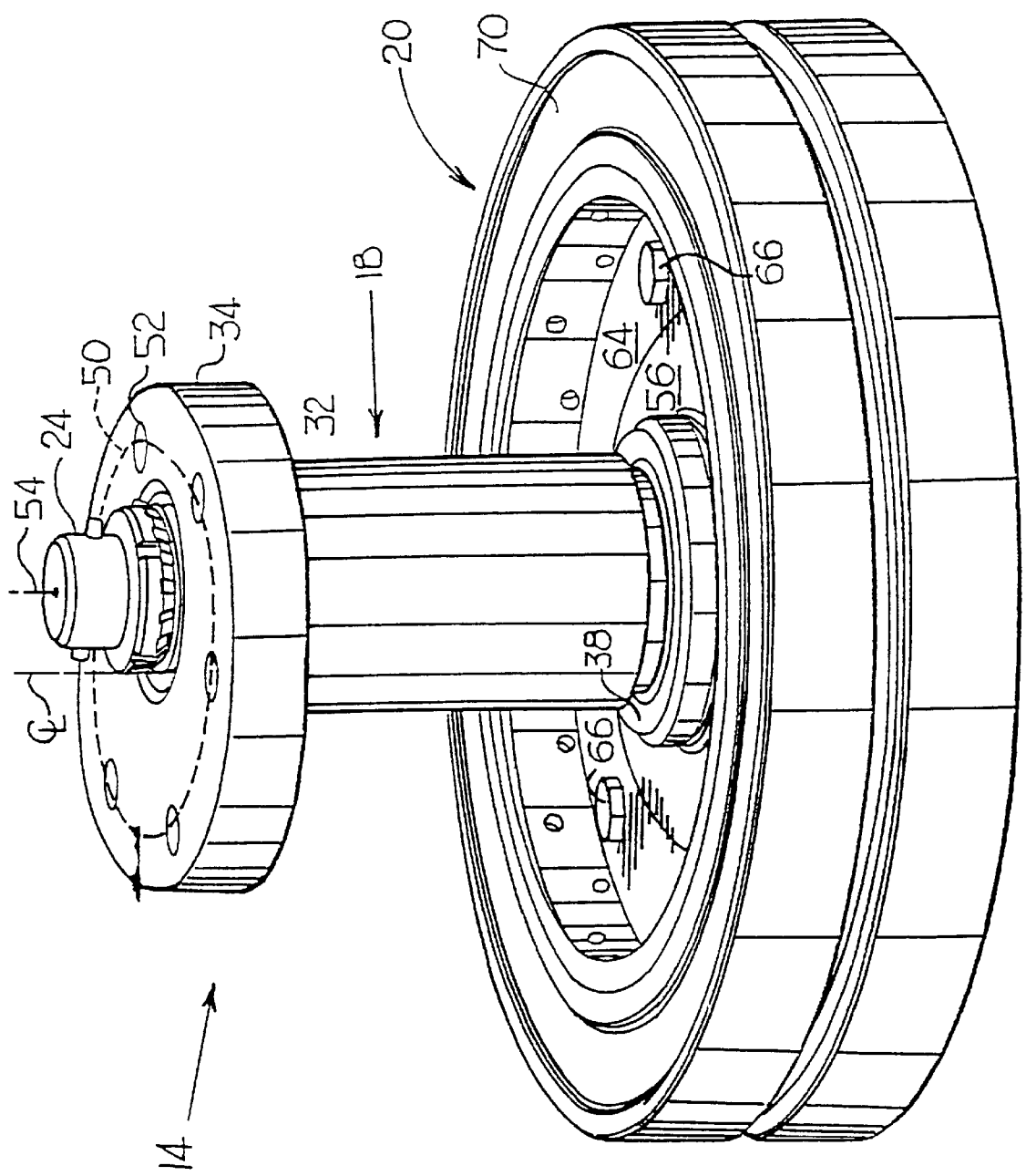
FIG. 4 is a perspective view of the guide wheel assembly of FIG. 1 having an offset bolt circle for attaching the guide wheel assembly to the guide frame of the rail guided vehicle.

Referring to FIGS. 2–4, a single guide wheel assembly 14 is shown and will now be discussed in further detail. The guide wheel assembly 14 generally includes a fixed component 18 connected to a rotating component 20 by a bearing assembly 22. The fixed component 18 includes a circular shaft 24 having a first end 26 and a second end 28. The shaft 24 includes an integrally formed flange 30 located adjacent the second end 28. A supporting sleeve 32 is coaxially received about the shaft 24. The supporting sleeve 32 has a first end face formed as a connecting flange 34 and a second end face 36. The connecting flange 34 is generally configured to attach to the guide frame 12 of the vehicle 10, as shown in FIG. 1. The second end face 36 of the sleeve 32 is generally in engagement with the bearing assembly 22, as discussed more fully hereinafter. A dust cover 38 may be positioned around the sleeve 32 and extend between the sleeve 32 and the rotating component 20 to prevent dirt and foreign objects from entering the bearing assembly 22. The shaft 24 and the sleeve 32 are made of steel.

A support member 40, such as a mushroom head or washer, is connected to the second end 28 of the shaft 24 by welding the support member 40 to the second end 28 of the shaft 24, or by attaching the support member 40 to the second end 28 of the shaft 24 by other methods customary in the art. The support member 40 may also be integrally formed with the shaft 24. A locknut 42, lockwasher 44 and washer 46 are generally used to connect the shaft 24 to the sleeve 32. Other suitable mechanical attachment schemes may be substituted in place of the locknut 42, lockwasher 44 and washer 46 combination shown in FIGS. 2 and 3, as will be appreciated by those skilled in the art. The fixed component 18 may further include a spring pin 48 passing through the shaft 24 at the first end 26 of the shaft 24 to capture the locknut 42 in case of a loose locknut 42.

The connecting flange 34 preferably defines a bolt circle 50 having six bolt holes 52 for attaching the guide wheel assembly 14 to the guide frame 12 with a plurality of bolts (not shown). The bolt circle 50 is not limited to six bolt holes, but can include a greater or fewer number of bolt holes depending on the forces acting on the guide wheel assembly 14 and the guide frame 12 (each shown in FIG. 1) as will be appreciated by those skilled in the art. A central axis 54 of the shaft 24 is preferably coextensive with a centerline ($\mathcal{C}$) of the bolt circle 50, as shown in FIG. 2. However, the centerline ($\mathcal{C}$) of the bolt circle 50 may be offset radially from the central axis 54 of the shaft 24 as shown in FIG. 4. An exemplary offset between the centerline ($\mathcal{C}$) of the bolt circle 50 and the central axis 54 of the shaft 24 will be about 3 mm. The offset between centerline ($\mathcal{C}$) of the bolt circle 50 and the central axis 54 of the shaft 24 enables the distance to be varied between left and right guide wheel assemblies 14 attached to the guide frame 12 and positioned on either side of the guide rail 16, as shown in FIG. 1. Consequently, the guide wheel assembly 14 of the present invention may be attached in different orientations with respect to the guide frame 12 (shown in FIG. 1). Due to these different orientations, the offset points into different directions allowing for different lateral positions for the guide wheel assembly 14. Tire wear, construction tolerances and the pre-load on the guide tire, which is part of the rotating component 20 discussed hereinafter, may be adjusted very easily as a result.

The rotating component 20, or rotating assembly, generally includes a hub 56 having an integrally formed and radially extending safety disc 58. The rotating component 20 is generally received about the shaft 24 and is coupled to the shaft 24 by the bearing assembly 22. The bearing assembly 22, as shown in FIG. 3, is coaxially received between the shaft 24 and the rotating component 20. The safety disc 58 extends outward radially from the hub 56 and includes oppositely facing faces 60 and a center portion 62. The rotating component 20 further includes a rim 64 positioned on each of the faces 60 of the safety disc 58. In particular, the rims 64 are connected to the center portion 62 of the safety disc 58. Preferably, a bolt 66 and nut 68 are used to secure the rims 64 to the center portion 62 of the safety disc 58. A guide tire 70 is molded to each of the rims 64. The safety disc 58 extends radially outward such that at least a portion of the safety disc 58 is positioned between the guide tires 70. The guide tires 70 are configured to engage the vertically extending guide rail 16 guiding the vehicle 10, as shown in FIG. 1. The safety disc 58 limits the lateral movement of the guide tires 70 with respect to the vertical guide rail 16 guiding the vehicle 10 in the event of failure or loss of the guide tires 64 as a safety feature. The safety disc 58 is at least partially located between the guide tires 70 to ensure this safety feature, even under high vertical movements of the guide tires 70. The safety disc 58 allows the use of a narrow guide rail arrangement wherein edges 70A and 70B of the guide tires 70 may move higher or lower than the guide rail. However, if any other devices reduce the vertical travel of the guide tires 70, the safety disc 58 may be provided on only one side of the guide tires 70.

The rotating component 20 may also work with one guide tire 70 and one rim 64 instead of two.

The bearing assembly 22 includes a sealed maintenance free bearing 72, referred to as a UNIPAC® bearing or the like. UNIPAC® is a trademark of the Timken Company and defines a pre-set, sealed and greased double-row tapered roller bearing that is maintenance free for life and equivalents thereto. The bearing assembly 22 provides for the rotation of the rotating component 20 about the shaft 24. The single-piece bearing 72 is one major contribution to the safety features of the guide wheel assembly 14. The bearing assembly 22 also supports the rotating component 20 relative to the fixed component 18 in both the radial and axial directions under normal operating conditions. The bearing 72 is preferably pressed into the hub 56 with a tight fit. As an additional safety feature, the bearing assembly 22 includes a snap ring 74 positioned about the hub 56 and configured to fix the bearing 72 into engagement with the hub 56. The bearing 72 is generally received around the shaft 24 with a loose fit. The axial position of the bearing 72 is ensured between the second end face 36 of the sleeve 32 and the flange 30 located adjacent the second end 28 of the shaft 24, by the locknut 42, lockwasher 44 and washer 46. In particular, when the locknut 42 located at the first end 26 of the shaft 24 is tightened at the first end 26 of the shaft 24 the flange 30 at the second end 28 of the shaft 24 will push the bearing 72 against the second end face 36 of the sleeve 32, thereby providing for the axial positioning of the bearing 72.

The guide wheel assembly 14 is configured so that the components of the rotating component 20 and the bearing assembly 22, as well as the supporting sleeve 32 of the fixed component 18, are mounted on the shaft 24 from the "top" or the first end 26 of the shaft 24. The support member 40 at the "bottom" or the second end 28 of the shaft 24 is adapted to prevent any catastrophic downward movement of the rotating component 20 and the bearing assembly 22 in event of failure of the bearing 72. In particular, the support member 40, typically a welded washer, will have a larger outer diameter than the inner diameter of the hub 56. The support member 40, or support means, is therefore provided as a safety feature and will take the full vertical load of the rotating component 20 in the event of failure of the bearing assembly 22 and, in particular, the bearing 72. The support member 40 advantageously prevents the hub 56, the rims 64 and the guide tires 70 from falling off the guide wheel assembly 14 in the event of failure of the bearing 72.

Furthermore, the guide wheel assembly 14 may be pre-assembled as a one-piece unit by mounting the rotating component 20 and the bearing assembly 22 around the shaft 24 from the first end 26 of the shaft 24. The guide wheel assembly 14 may then be easily mounted to the guide frame 12 of the vehicle 10 with the connecting flange 34 formed at the first end face of the sleeve 32. The connecting flange 34 is easily bolted to the guide frame 12 of the vehicle 10 with a plurality of bolts (not shown) cooperating with the bolt circle 50. The guide wheel assembly 14 is quickly removable from the guide frame 12 in a similar manner.

The present invention is also a method of assembling the guide wheel assembly 14 described hereinabove and configured for attachment to the guide frame 12 of the rail guided vehicle 10 shown in FIG. 1. Referring to FIGS. 1–4, the method generally includes the steps of: providing the shaft 24 having a first end 26 and a second end 28; welding the support member 40 to the second end 28 of the shaft 24; press-fitting the bearing assembly 22 into the hub 56 of the rotating component 20 with a tight fit such that the bearing assembly 22 and the rotating component 20 are coupled together; positioning the coupled bearing assembly 22 and rotating component 20 on the shaft 24, with the coupled bearing assembly 22 and rotating component 20 mounted onto the shaft 24 from the first end 26 to the second end 28 and mounted on the shaft 24 with a loose fit; positioning the sleeve 32 about the shaft 24, with the sleeve 32 mounted onto the shaft 24 from the first end 26 to the second end 28, and with the sleeve 32 having its first end face formed as the connecting flange 34 configured for attachment to the guide frame 12 of the rail guided vehicle 10 and further having its second end face 36 in contact with the bearing assembly 22; and connecting the sleeve 32 to the shaft 24 with a fastener. The sleeve 32 is preferably mounted to the shaft 24 with the dust cover 38 connected previously to the sleeve 32. The method may also include the step of connecting the guide wheel assembly 14 to the guide frame 12 of the rail guided vehicle 10.

The presently disclosed invention provides a guide wheel assembly having improved safety characteristics and which that may be easily pre-assembled as a one-piece unit. The guide wheel assembly of the present invention may be quickly mounted to the guide frame of a rail guided vehicle, thereby facilitating fast installation and efficient maintenance of the guide wheel assembly.

Although this invention has been described with reference to a preferred embodiment, obvious modifications and alterations of the present invention may be made without departing from the spirit and scope of the invention. The scope of the present invention is defined in the appended claims and equivalents thereto.

What is claimed is:

1. A guide wheel assembly for a guide frame of a rail guided vehicle, comprising:
    a shaft having a first end and a second end, with the shaft having an integrally formed flange located adjacent the second end of the shaft;
    a sleeve positioned about the shaft, with the sleeve having a first end face and a second end face, and with the first end face configured for attachment to the guide frame of the rail guided vehicle;
    a bearing positioned rotatably about the shaft and located axially between the flange and the second end face of the sleeve;
    a rotating assembly positioned about the bearing and coupled to the shaft by the bearing, with the rotating assembly configured to cooperate with a vertical guide rail for guiding the rail guided vehicle; and
    support means connected to the second end of the shaft and configured to support the bearing and the rotating assembly in a vertical direction in the event of failure of the bearing.

2. The guide wheel assembly of claim 1, wherein the rotating assembly further includes:
    a hub positioned about the bearing and having an integrally formed and radially extending safety disc, with the safety disc having two faces; and
    a pair of rims each having a guide tire connected thereto, with the rims connected respectively to the two faces of the safety disc, and with the guide tires configured to engage the guide rail,
    wherein the safety disc at least partially extends between the guide tires such that in the event of failure of the guide tires the safety disc limits lateral movement of the guide tires with respect to the guide rail.

3. The guide wheel assembly of claim 2, further including a dust cover positioned about the sleeve and extending between the sleeve and the hub for preventing dirt from entering the bearing.

4. The guide wheel assembly of claim 2, further including a snap ring positioned about the flange located adjacent the second end of the shaft and configured to secure the bearing to the hub.

5. The guide wheel assembly of claim 1, wherein the first end face of the sleeve is formed as a connecting flange defining a bolt circle such that the guide wheel assembly is connectable to the guide frame of the rail guided vehicle with a plurality of bolts cooperating with the bolt circle, and wherein the bolt circle has a centerline coextensive with a central axis of the shaft.

6. The guide wheel assembly of claim 5, wherein the centerline of the bolt circle is offset radially from the central axis of the shaft.

7. A guide wheel assembly for a guide frame of a rail guided vehicle, comprising:
    a shaft having a first end and a second end, with the shaft having an integrally formed flange located adjacent the second end of the shaft;
    a sleeve positioned about the shaft, with the sleeve having a first end face and a second end face, and with the first end face configured for attachment to the guide frame of the rail guarded vehicle;
    a bearing positioned rotatably about the shaft and located axially between the flange and the second end face of the sleeve;
    a rotating assembly positioned about the bearing and coupled to the shaft by the bearing, with the rotating assembly configured to cooperate with a vertical guide wheel for guiding the rail guided vehicle; and support means connected to the second end of the shaft and spaced vertically below and not contacting the rotating assembly, the support means supporting the bearing and the rotating assembly in a vertical direction in the event of failure of the bearing.

8. The guide wheel assembly of claim 7, wherein the rotating assembly further includes:

a hub positioned about the bearing and having an integrally formed and radially extending safety disc, with the safety disc having two faces; and a pair of rims each having a guide tire connected thereto, with the rims connected respectively to the two faces of the safety disc, and with the guide tires configured to engage the guide rail, wherein the safety disc at least partially extends between the guide tires such that in the event of failure of the guide tires the safety disc limits lateral movement of the guide tires with respect to the guide rail.

9. The guide wheel assembly of claim 8, further including a dust cover positioned about the sleeve and extending between the sleeve and the hub for preventing dirt from entering the bearing.

10. The guide wheel assembly of claim 8, further including a snap ring positioned about the flange located adjacent the second end of the shaft and configured to secure the bearing to the hub.

11. The guide wheel assembly of claim 7, wherein the first end face of the sleeve is formed as a connecting flange defining a bolt circle such that the guide wheel assembly is connectable to the guide frame of the rail guided vehicle with a plurality of bolts cooperating with the bolt circle, and wherein the bolt circle has a centerline coextensive with a central axis of the shaft.

12. The guide wheel assembly of claim 11, wherein the centerline of the bolt circle is offset radially from the central axis of the shaft.

* * * * *